United States Patent
Pogmore et al.

(10) Patent No.: US 10,536,272 B2
(45) Date of Patent: Jan. 14, 2020

(54) ENCRYPTION SYSTEM WITH DOUBLE KEY WRAPPING

(71) Applicant: ORACLE INTERNATIONAL CORPORATION, Redwood Shores, CA (US)

(72) Inventors: George R. Pogmore, Denver, CO (US); Pradip K. Pandey, Parker, CO (US)

(73) Assignee: ORACLE INTERNATIONAL CORPORATION, Redwood Shores, CA (US)

( * ) Notice: Subject to any disclaimer, the term of this patent is extended or adjusted under 35 U.S.C. 154(b) by 0 days.

(21) Appl. No.: 16/208,285

(22) Filed: Dec. 3, 2018

(65) Prior Publication Data

US 2019/0116032 A1    Apr. 18, 2019

Related U.S. Application Data

(62) Division of application No. 15/232,864, filed on Aug. 10, 2016, now Pat. No. 10,148,437.

(60) Provisional application No. 62/221,292, filed on Sep. 21, 2015.

(51) Int. Cl.
   *H04L 9/08* (2006.01)
   *H04L 9/06* (2006.01)
   *H04L 9/32* (2006.01)

(52) U.S. Cl.
   CPC ......... *H04L 9/0894* (2013.01); *H04L 9/0643* (2013.01); *H04L 9/0822* (2013.01); *H04L 9/0863* (2013.01); *H04L 9/0869* (2013.01); *H04L 9/3236* (2013.01)

(58) Field of Classification Search
   CPC ... H04L 9/0894; H04L 9/3236; H04L 9/0869; H04L 9/0822; H04L 9/0863; H04L 9/0643
   See application file for complete search history.

(56) References Cited

U.S. PATENT DOCUMENTS

| | | | |
|---|---|---|---|
| 6,049,612 A | 4/2000 | Fielder | |
| 6,272,632 B1 | 8/2001 | Carman | |
| 8,667,273 B1 | 3/2014 | Billstrom | |
| 9,806,887 B1 * | 10/2017 | Campagna | ............ H04L 9/0637 |
| 10,148,437 B2 * | 12/2018 | Pogmore | ............... H04L 9/0894 |

(Continued)

OTHER PUBLICATIONS

McGrew: An Interlace and Algorithms for Authenticated Encryption; Jan. 2008, Cisco Systems, Inc. pp. 1-21; downloaded on Aug. 9, 2016 from: https://www.ietf.org/rfc/rfc5116.txt.

(Continued)

*Primary Examiner* — Matthew Smithers
(74) *Attorney, Agent, or Firm* — Kraguljac Law Group, LLC

(57) ABSTRACT

Systems, methods, and other embodiments associated with encryption are described. In one embodiment, a method comprises selecting a secret key for encryption and encrypting the secret key by applying a first pass of Authenticated Encryption with Additional Data (AEAD) using first keys generated from a random seed value. The random seed value is encrypted by applying a second pass of the Authenticated Encryption with Additional Data (AEAD) using second keys generated from the encrypted secret key. A wrapped key is generated by combining the encrypted secret key and the encrypted random seed value.

15 Claims, 14 Drawing Sheets

(56) References Cited

U.S. PATENT DOCUMENTS

| | | | |
|---|---|---|---|
| 2008/0084996 A1* | 4/2008 | Chen | G06F 21/64 |
| | | | 380/28 |
| 2008/0104417 A1 | 5/2008 | Nachtigall | |
| 2008/0307020 A1 | 12/2008 | Ko | |
| 2010/0169645 A1* | 7/2010 | McGrew | H04L 9/0822 |
| | | | 713/170 |
| 2010/0268960 A1 | 10/2010 | Moffat | |
| 2015/0124961 A1 | 5/2015 | Lambert | |
| 2016/0156464 A1 | 6/2016 | Naslund | |

OTHER PUBLICATIONS

EVP Authenticated Encryption and Decryption; from Open SSL Wiki; pp. 1-6; downloaded on Aug. 9, 2016 from: https://wiki.openssl.org/index.php/EVP_Authenticated_Encryption_and_Decryption.

* cited by examiner

ENCRYPTION SYSTEM WITH DOUBLE KEY WRAPPING

CROSS REFERENCE TO RELATED APPLICATIONS

This disclosure claims the benefit of U.S. Provisional Patent Application Ser. No. "62/221,292" filed Sep. 21, 2015, titled "Encryption System with Key Recovery and Double AEAD Key Wrapping", and is a divisional of U.S. patent application Ser. No. 15/232,864 (now U.S. Pat. No. 10,148,437), filed Aug. 10, 2016, which are both incorporated by reference herein in their entirety.

BACKGROUND

In today's business environment, data is often created and exchanged in electronic form. Keeping electronic data confidential and secure is a challenging endeavor. To these ends, electronic data is often encrypted at a source location before being transmitted to a destination location. Encryption is the process of converting data into a disguised code. Access to a secret key or password is required in order to decrypt the data at the destination location. Encrypted data is sometimes referred to as cipher text and unencrypted data is sometimes referred to as plain text.

Sometimes the secret key or the password gets lost. Recovering from a lost key value or a lost password does not have a general solution. In many cases, the encrypted data cannot be recovered after a key is lost. If specific hardware is related to the encrypted data, then it is possible to have a key recovered from a key store using a hash value of the hardware's serial number. For example, encrypted disk files may be recovered by using the serial number of the disk. Of course, the encryption system must be designed with key recovery in mind in order to have the alternative access method to the key store. In purely software solutions, systems that recover lost key stores or lost passwords are unknown.

Keys (key values or key material) are often hidden or wrapped for security reasons. The most general way to wrap (hide) key material is to encrypt the key material using a master key that is stored elsewhere. When wrapping involves a specific piece of hardware, sometimes a serial number (or other unique hardware identifier) is used as the basis (such as its hashed value) to wrap the key. However, when the system is completely software oriented, without a direct tie to an available unique identifier, an outside master key is frequently used. That master key value may itself be wrapped, which requires a second master key. At some point, there is at least one master key that must be obfuscated. In general, the master key obfuscation is not as secure as encrypted key wrapping.

BRIEF DESCRIPTION OF THE DRAWINGS

The accompanying drawings, which are incorporated in and constitute a part of the specification, illustrate various systems, methods, and other embodiments of the disclosure. It will be appreciated that the illustrated element boundaries (e.g., boxes, groups of boxes, or other shapes) in the figures represent one embodiment of the boundaries. In some embodiments one element may be implemented as multiple elements or that multiple elements may be implemented as one element. In some embodiments, an element shown as an internal component of another element may be implemented as an external component and vice versa. Furthermore, elements may not be drawn to scale.

DETAILED DESCRIPTION

Figure 1:
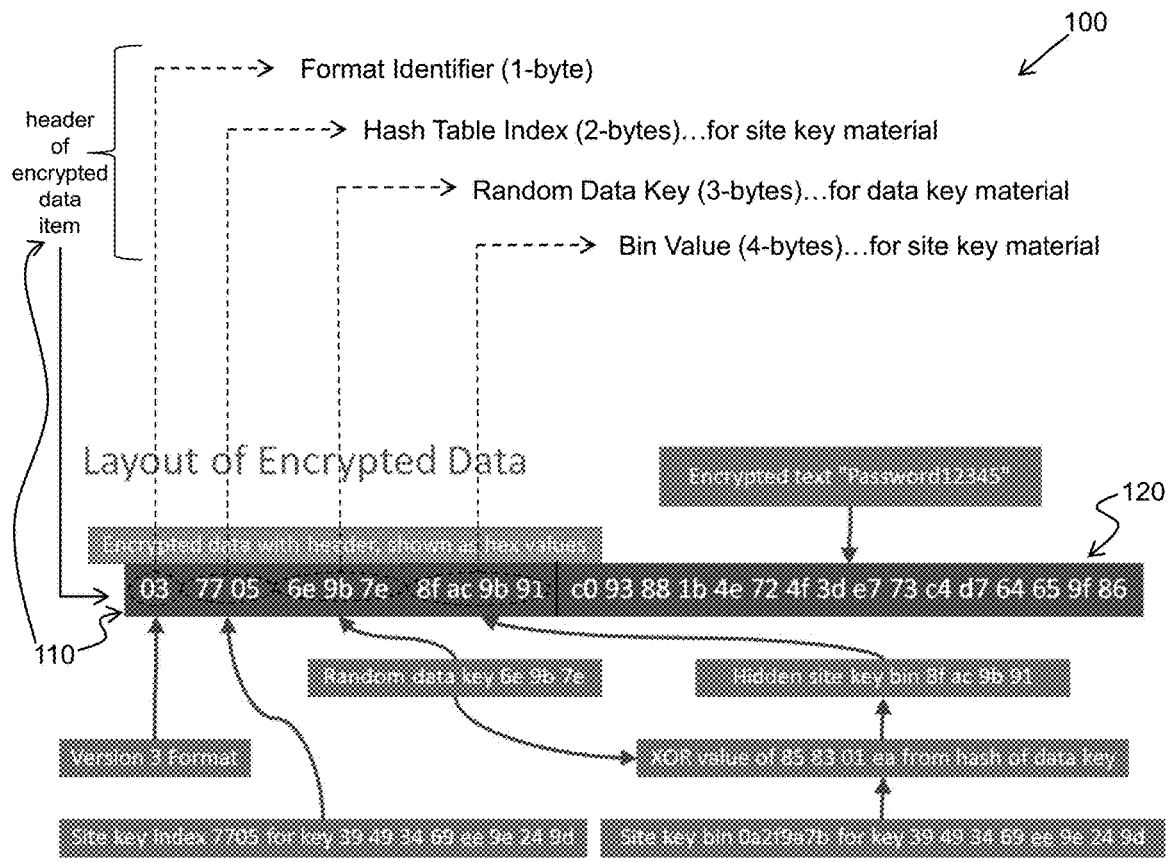
FIG. 1 illustrates one embodiment of a layout of an encrypted data item.

Computerized systems, methods, and other computerized embodiments are disclosed that provide for the recovering of a site key used to encrypt data items. An encryption system may use an encryption key that is either stored in a key store system or is generated from an entered password. Previously, when the key store is lost or the password is forgotten, the encrypted data items could not be decrypted. Therefore, the ability to recover encrypted data is provided herein after the loss of the configured site key value or an associated password. When a site key value is lost, the site key value can be recovered using header values that are stored with the encrypted data items. Embodiments provide a unique capability for a software solution, where the data cannot be tied to a specific piece of hardware.

Computerized systems, methods, and other computerized embodiments are also disclosed that provide for wrapping (hiding) key material without using an outside master key. A random value is used to wrap the key material, while the encrypted key material is used to wrap the original random value. Therefore, there is no outside master key that needs to be stored and obfuscated and this improves previous techniques that required an outside master key. To un-wrap the wrapped key, the secret keys are derived from key generation functions that use the wrapped key value as input. The key wrapping process includes two passes of Authenticated Encryption with Additional Data (AEAD). AEAD is a very secure way to encrypt data items.

The following terms are used herein with respect to various embodiments.

The term "data item", as used herein refers to a number of digital bytes of data (e.g., 16-bytes of digital data) representing information to be encrypted and decrypted for security reasons.

The term "site key" or "site key value", as used herein, refers to information (e.g. a parameter) that is used for encryption and decryption which is derived from a password (e.g., established by a system administrator for a site) via a hashing process.

The term "key material", as used herein, refers to pieces of information (e.g., parameters) that are used in encryption and decryption processes. Key material may include a site key value, a random data key value, and a program version key value, for example.

The term "hash" or "hashing", as used herein, refers to the process of generating values from a string of text using a mathematical function. Hashing is a method to provide security during, for example, message transmission. A formula is used to generate the hash, which helps to protect the transmission from unauthorized users.

Overview of Encryption System with Key Recovery

Described herein is a method of encryption that uses generated keys based on a site key value which is stored in a configuration file. If the site key value is lost, it can be recovered using header values that are stored with the encrypted data items.

In accordance with embodiments described herein, a service provider can provide encryption software and services to a client. The client can use the encryption software to encrypt his data at the client site to keep his data secure. Software keys and passwords are used to decrypt the data as needed. However, if the client loses an encryption key and cannot decrypt the data, the service provider can provide the service of recovering the key at the service provider site. Computerized systems and methods are described herein that are configured to recover encrypted data after the loss of the configured site key or password. The systems and methods provide a unique capability for a software solution, where the data cannot be tied to a specific piece of hardware.

Depending on what is encrypted, there could be major financial consequences if encrypted data could not be decrypted following the loss of a key value. Smaller businesses may fail to back up the configuration file. If the configuration file is inadvertently deleted or the disk fails, the encryption system disclosed herein provides a method to recover any site key values that were in a lost configuration file. Large businesses are more likely to back up the configuration files, but they may lose the passwords that were used to generate the site key values. The passwords may be forgotten, or the password knowledge may leave the company through personnel changes. In any of these scenarios, the encryption system disclosed herein allows data to continue to be decrypted, following recovery of the lost site key values. Encrypted data may be temporarily unavailable while a lost site key is being recovered, but it will not be permanently unavailable.

In one embodiment, an encryption system uses generated keys to encrypt data items. The key generation is based on a site key value that is found in a configuration file. Each data item has a different encryption key. Each site key value uses hashed values to identify the site key used for encryption. The hashed values are stored as a header with the encrypted data. For decryption, the hashed values are used to identify and retrieve the same site key that was used for encryption. In the case of a lost site key, the hashed values, found in the header of an encrypted data item, can be used to recover the original site key value. Embodiments herein provide a basis of an encryption system for data used within an enterprise system, and depend on hashing methods and hashing parameters. Both the security of the site key values and the recovery of the site key values are dependent on the specific hashing implementation.

Overview of Double AEAD Key Wrapping

Also described herein is a process to wrap (hide) key material without using an outside master key, which improves and simplifies previous techniques that required the outside master key by eliminating its use. A random value is used to wrap the key material, while the key material is used to wrap the random value.

In one embodiment, a random value is used to wrap the key material with encryption, instead of using a master key. The random value is then itself encrypted and wrapped, using the key material. Therefore, there is no outside master key that needs to be stored and obfuscated. There is no master key stored in a file or in program code. To un-wrap the wrapped key, the secret keys are derived from key generation functions that use the wrapped key value as input.

The key wrapping includes two passes of Authenticated Encryption with Additional Data (AEAD). AEAD is a very secure way to encrypt data items. AEAD involves encrypting a value and authenticating the value using a digital signature which can verify both the encrypted data and additional unencrypted data. One pass of AEAD is used to encrypt the original key material. Another pass of AEAD is used to encrypt a random seed value. The wrapped key is the result of the two passes of AEAD. The value of a wrapped key material is securely hidden. The key material can be used to generate Advanced Encryption Standard (AES) keys that can be used to securely encrypt other data items.

Details of Encryption System with Key Recovery

Described herein are systems and methods to prevent the loss of encrypted data at client (customer) sites. Encrypted data requires a key to decrypt the data. Customers are responsible for backing up their key store. Key recovery is performed as an emergency operation. A key recovery process can be performed at the service provider site and, therefore, customer data is not lost forever after losing a site key. Reversal to recover a key involves having knowledge of both the hash functions and a site key filter. Again, reversal is run at the service provider site by the service provider.

Different keys are generated for different clients. Also, different keys are generated for each piece of encrypted data (an encrypted data item). Headers are stored along with the encrypted data. Key material is split across program version, site key, and data headers. Recovery feasibility is tested during initial encryption and new key selection is performed if key recovery is ambiguous. The key material is stored in three places including within a configuration file, within each piece of encrypted data, and within a program (as version-based salts and hash function parameters). In one embodiment, the key material is combined and hashed to create an AES encryption key. A header stores the parameters along with the encrypted data.

In accordance with one embodiment, an administrator defines a site key by entering a site password. Text representing the hidden site key is stored in a configuration file. An AES key is generated, by the client, for each piece of encrypted data. That is, each piece of data has its own key for AES encryption. Generation of an AES key involves using a combination of a site key, a random data key, and a program version key which constitutes the key material.

An AES key is generated from hashing the combination of the key material. Hashing is a process or function of generating a number or string (a hash value) from an input string of data (e.g., text). The resulting hash value is a fixed length and varies widely with small variations in the input string. Furthermore, it is practically impossible to recreate the input data from its hash value alone.

In one embodiment, there are over sixteen (16) million possible AES keys per one (1) site key. One (1) AES key is used to encrypt each piece of data and a header is added to the encrypted data format to indicate the encryption parameters.

Again, the key material is stored in three (3) places. In one embodiment, the site key is eight (8) bytes and is stored in a configuration file. The data key is three (3) bytes and is stored in the data header. The program version key is one (1) byte and identifies version-based salts and hash function parameters. The key material is concatenated and then hashed using a hash process (function). The hashing process generates the actual key used for AES encryption and eliminates any mathematical link back to the source key materials. Illicit discovery of one AES key does not reveal any other AES keys. Also, illicit discovery of a site key does not reveal any AES keys.

FIG. 1 illustrates one embodiment of a layout of an encrypted data item 100. Referring to FIG. 1, an item of encrypted data 100 includes a header 110 and an encrypted value 120. The header 110 includes four (4) parameters including:

(1) a one-byte format identifier (version), to identify header format and code parameters;

(2) a two-byte hash-table index for site key material;

(3) a three-byte random data key or value for data-specific key material; and (4) a four-byte hash-table bin identifier or value for site key material (masked with a hash of a three-byte random value).

The data is encrypted using AES encryption, and the encrypted value 120 follows the header 110 in the layout. The header 110 portion of the encrypted data item 100, shown in FIG. 1, can be furnished to a service provider for the service provider to recover the site key for the customer (e.g., if the site key has been lost).

Figure 2:
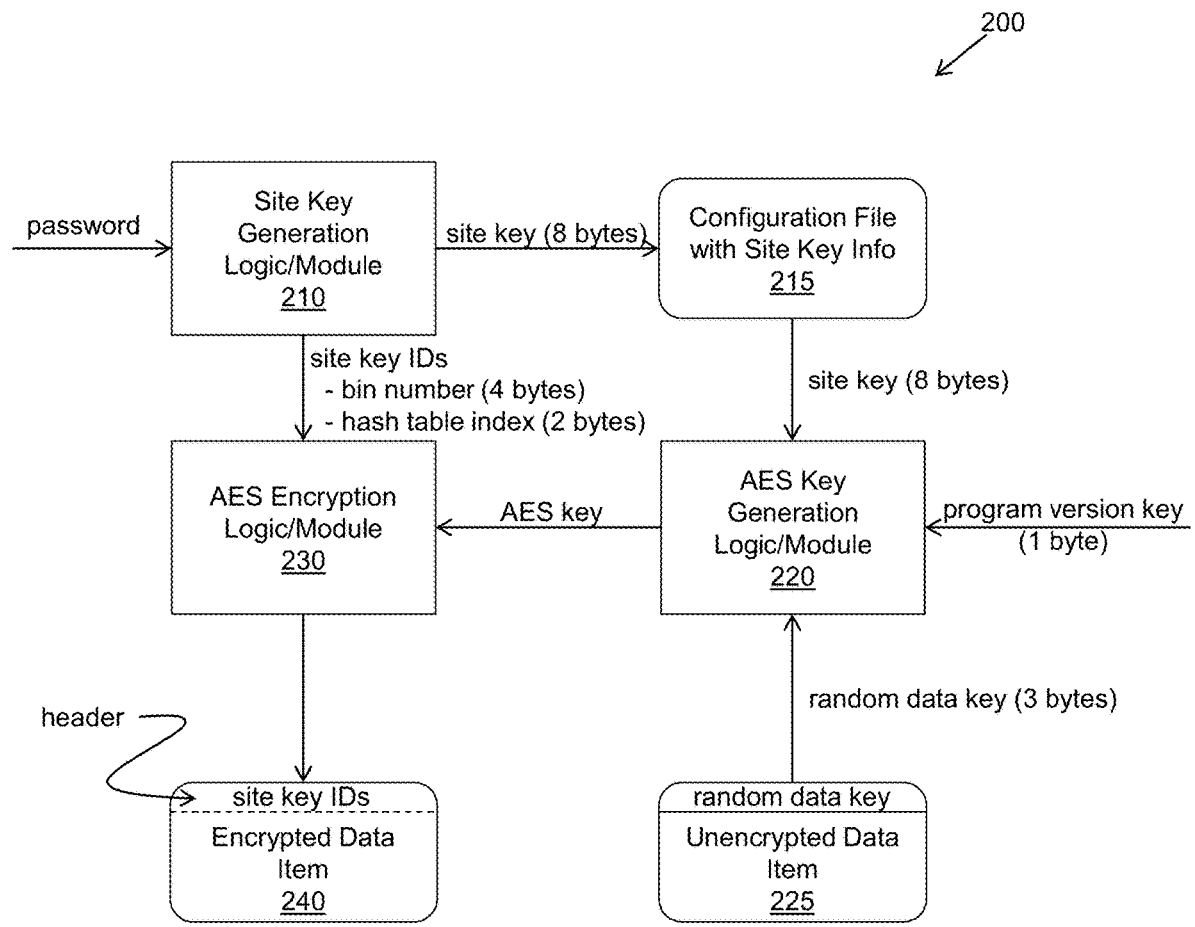
FIG. 2 illustrates one embodiment of an encryption system that generates a site key value used in an encryption process performed by the encryption system to generate the encrypted data item of FIG. 1.

FIG. 2 illustrates one embodiment of an encryption system 200 that generates a site key value used in an encryption process performed by the encryption system 200 to generate an encrypted data item (e.g., the encrypted data item 100 of FIG. 1). The encryption system 200 includes site key generation logic/module 210 configured to generate a site key value from a password and store the site key value in a configuration file 215. The encryption system 200 also includes an AES key generation logic/module 220 configured to generate an AES key value based on key material which includes the site key value (e.g., 8 bytes), a random data key value (e.g., 3 bytes), and a program version key value (e.g., 1 byte). The random data key value may be generated and stored as part of an unencrypted data item 225 which is to be encrypted by the system 200.

The encryption system 200 also includes an AES encryption logic/module 230 configured to encrypt the unencrypted data item 225, using the AES key generated by AES key generation logic/module 220, to form the encrypted data item 240 which has a header as described above herein. The information in the header can be used to recover the site key value that was used to form the AES key if the site key value gets lost, for example.

Site key generation logic/module 210 is also configured to generate a bin number value and a hash table index from the site key value. The bin number value and the hash table index are also known herein as site key identifiers (ID's). The bin number value and the hash table index are stored in the header of the encrypted data file. As shown in the embodiment of FIG. 2, site key generation logic/module 210 provides the bin number value and the hash table index to AES encryption logic/module 230. Details of generating the bin number value and the hash table index are discussed later herein.

With reference to FIG. 2, in one embodiment, the encryption system 200 is implemented on a computing device that includes the logics or modules for implementing and controlling the various functional aspects of the encryption system 200. Other embodiments may provide different logics or combinations of logics that provide the same or similar functionality, and control of that functionality, as the encryption system 200 of FIG. 2. In one embodiment, the encryption system 200 is an executable application including algorithms and/or program modules configured to perform the functions of the logics. The application is stored in a non-transitory computer storage medium. That is, in one embodiment, the logics of the encryption system 200 are implemented as modules of instructions stored on a computer-readable medium.

Figure 3:
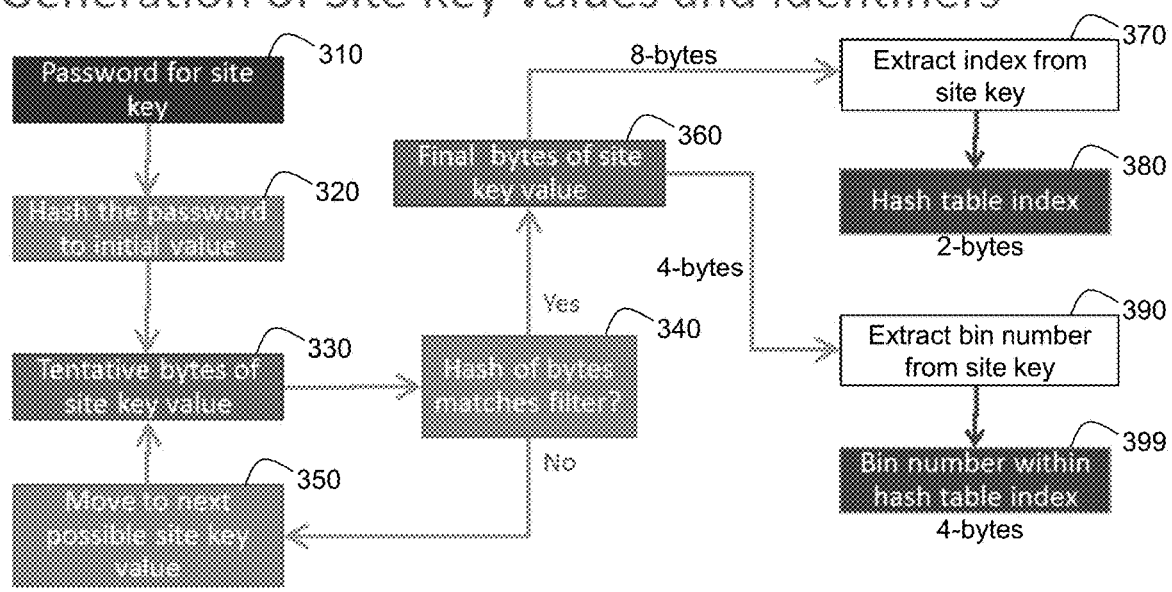
FIG. 3 illustrates one embodiment of a process performed by the encryption system of FIG. 2 to generate site key values and identifiers.

FIG. 3 illustrates one embodiment of a process 300 performed by the encryption system 200 of FIG. 2 to generate site key values and identifiers. The creation of site key material is based on a password. That is, a site key value is generated by applying a hash function at 320 to a site key password 310. A tentative site key 330 has to pass a site key filter or check at 340. If the check at 340 is not passed, the process moves, at 350, to the next possible site key value. The actual site key universe is smaller than the apparent site key universe which can be very large. Brute force recovery would result in searching the large apparent site key universe. A smaller, filtered universe makes recovery of the final site key value 360 feasible.

In one embodiment, a site key value is wrapped for a configuration file. A site key has a unique unwrapping such that new wrapping parameters are selected if the unwrapping is ambiguous. Site key material values are stored in an INI entry. A site key value is wrapped and hidden in a randomized text string. The site key text string is stored in a configuration file.

In one embodiment, site key values are eight (8) bytes in length. The eight (8) bytes are input to a hashing function at 370 and hashed to two (2) bytes which are used as a hash table index 380. Six (6) of the eight (8) bytes are input to a hashing function and hashed to two (2) bytes which are used as a site key filter at 340. Four (4) of the eight (8) bytes (e.g., the first 4-bytes) are hashed to four (4) bytes at 390 which are used as a bin identifier (bin number or value) 399 within the hash table index 380 to resolve index collisions. As a result, each site key corresponds to two identifiers (IDs). A two (2) byte hash value is used as an index 380. A four (4)

byte hash value is used as a bin identifier 399 to resolve index collisions. Both IDs are stored in the header of the encrypted data item.

Example site key ID values in hexadecimal format are as follows:

| Site key index | Site key bin ID | Site key value |
| --- | --- | --- |
| 7705 | 0a2f9a7b | 39 49 34 69 ee 9e 24 9d |
| c43d | 5e39324d | b1 88 3d 56 c2 27 1b 18 |
| 643f | e711b58d | 37 a0 56 00 4b d5 98 17 |

As a result, when site key material is lost, the site key material can be regenerated. For example, the site key can be re-created using the same password. However, a forgotten password requires site key recovery. Fortunately, the site key can be recovered using the header of the encrypted data item at the service provider site, in accordance with one embodiment. Reversal using the header takes knowledge of both the hash functions and the site key filter.

Figure 4:
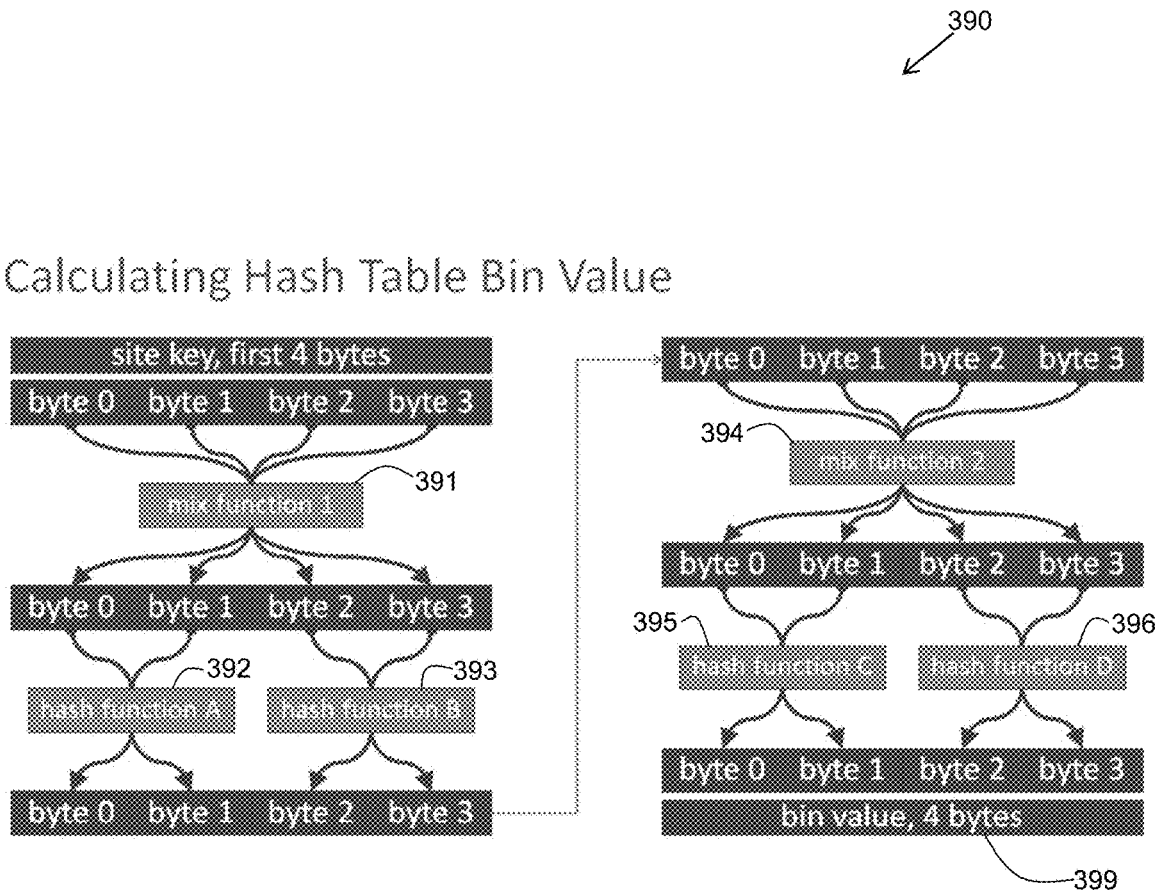
FIG. 4 illustrates one embodiment of a process for calculating a hash table bin value as part of the process of FIG. 3.

The bin number 399 is used for collisions of site keys within the same hash table index. Again, the bin number is four (4) bytes and is derived from the first four (4) bytes of the site key value. FIG. 4 illustrates one embodiment of a process 390 for calculating a hash table bin value 399 as part of the process 300 of FIG. 3. In accordance with one embodiment, mixing functions are used to calculate the bin values from the site key values in FIG. 4. Two mixing functions are used at 391 and 394 to re-arrange the bits within the four (4) bytes. Four (4) hash functions (A, B, C, D in FIG. 4) are used at 392, 393, 395, and 396 to hash two (2) bytes into two (2) bytes in FIG. 4.

Figure 5:
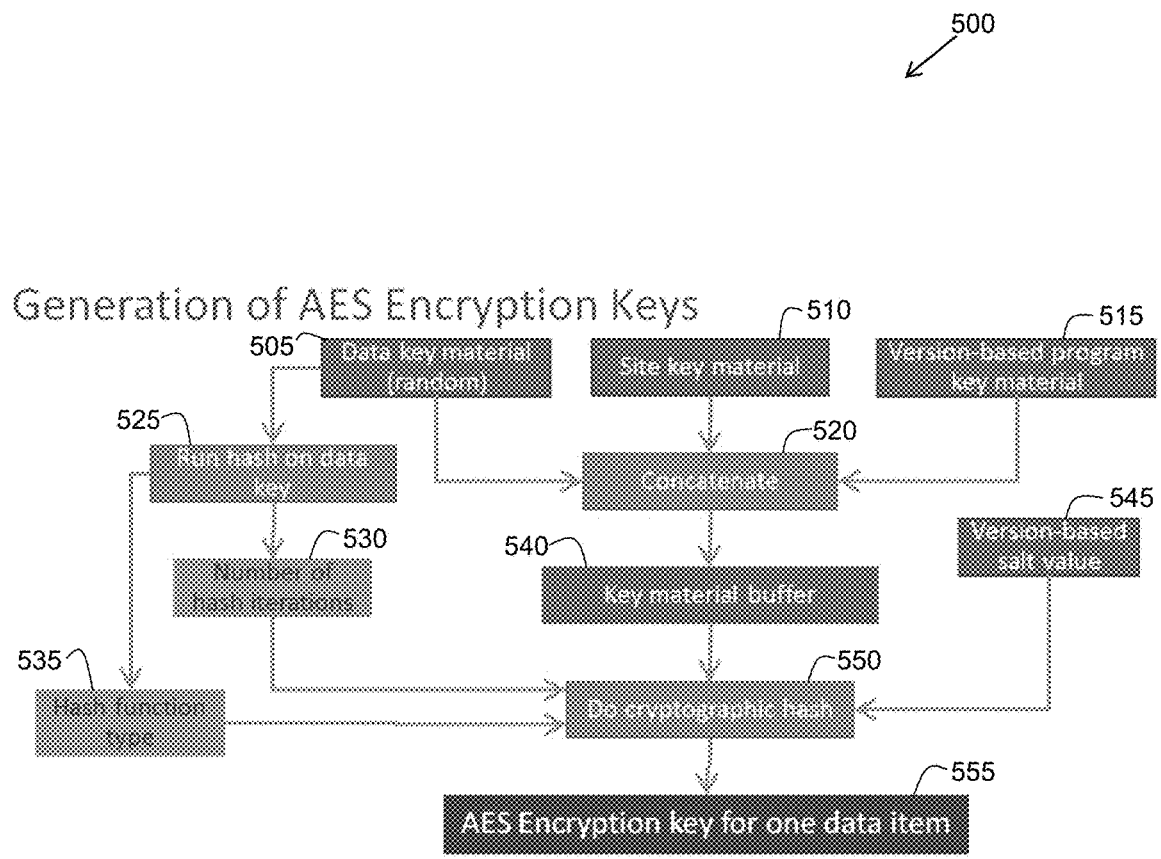
FIG. 5 illustrates one embodiment of a process to generate an AES encryption key from key material for a data item using hashing techniques, as performed by the encryption system of FIG. 2.

FIG. 5 illustrates one embodiment of a process 500 to generate an AES encryption key from key material for a data item using hashing techniques, as performed by the encryption system 200 of FIG. 2. The key material includes random data key material 505, site key material 510, and version-based program key material 515 which are concatenated together at 520 to form the key material in the buffer 540. The random data key material 505 is hashed at 525. The secret of the site key values and the recovery process lies in the hash functions. The hash function parameters define the type of hash functions at 535, an initial salt value at 545, a number of iterations at 530, a data input length, a subset selection of hashed output, and an output length from concatenation of hashed subset values. The version identifies the format and parameters for hashing. The format identifies which input bytes to hash. Prefix and suffix salt bytes may be added to the hash input. Any of multiple cryptographic hash functions may be employed (e.g., SHA-512, SHA-256, checksum) at 550 to generate an AES encryption key 555 for one data item. The number of hash iterations at 530 can be variable and the truncation length of the hash output can be variable.

Figure 6:
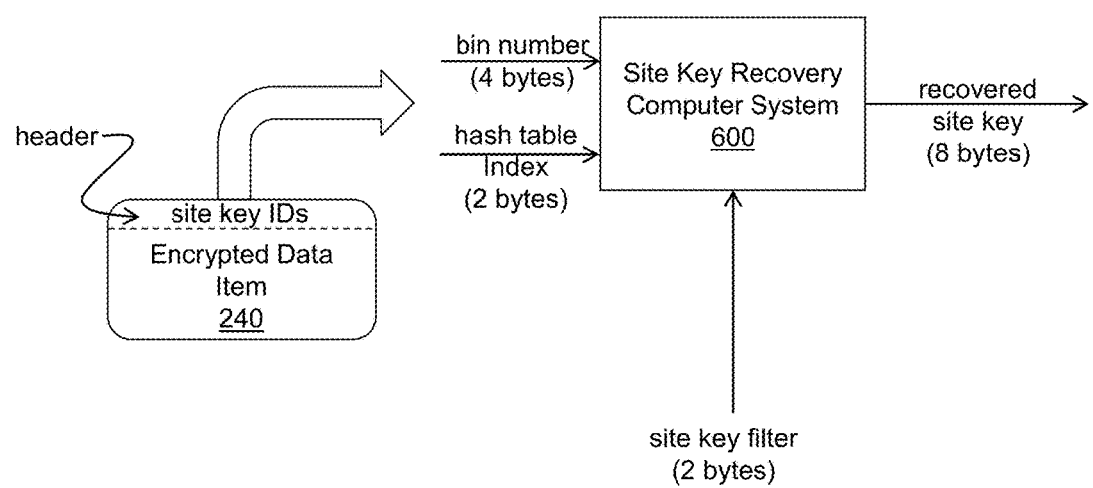
FIG. 6 illustrates one embodiment of extracting a bin number and a hash table index from a header of an encrypted data item generated by the encryption system of FIG. 2 into a site key recovery computer system to recover a lost site key used in encryption and decryption processes.

FIG. 6 illustrates one embodiment of extracting a bin number value and a hash table index (from a header of an encrypted data item 240 generated by the encryption system 200 of FIG. 2). The bin number, the hash table index, and a site key filter are input into a site key recovery computer system 600 to recover a lost site key used in encryption and decryption processes. In one embodiment, the bin number value is 4-bytes, the hash table index is 2-bytes, and the site key filter is 2-bytes.

The site key filter is known to the service provider and is built in to the code that generates the site key value and also into the code that recovers the site key value. In one embodiment, the site key value is a specified 2-byte hash value (one of 65536 possible values). The hash value is used to select potential site keys. If a generated site key does not have the specified hash value, then that generated site key will not be used. All valid site keys will match the specified hash value filter. Therefore, it is known that the recovered site key must also pass the filter. The same site key filter may be used across all site keys and does not require information that is tied to one encryption instance. The first byte of the encrypted data item is a version number and the site key filter may vary across versions. Different encryption versions may use different hash functions and different hash values. Indirectly, the site key filter is specified by the version format that is stored with the data.

The site key filter is a mathematical property (resulting hash value) of the site key. In one embodiment, the site key filter is narrowed to one possibility within each group of 65536 possible values. The site key filter is used when a specific site key value is generated. The same mathematical property can later be used during the key recovery process. In one embodiment, the site key filter allows the first recovered four (4) bytes to be expanded into a recovered six (6) bytes, which is then expanded into the recovered eight (8) bytes of the site key value, as discussed later herein. Again, a service provide provides the key recovery service. Key recovery is based on a validated service request from a client.

Figure 7:
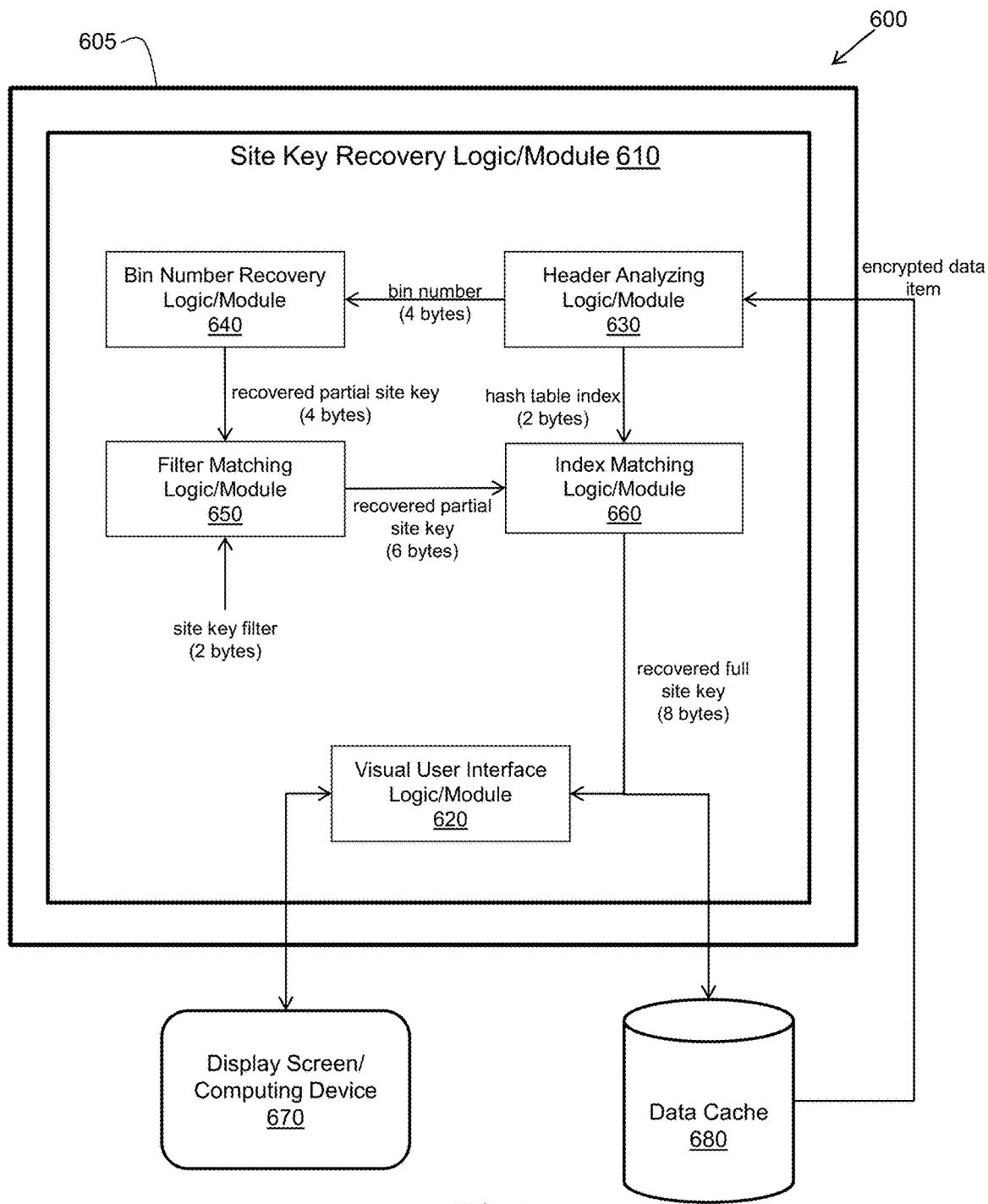
FIG. 7 illustrates one embodiment of the site key recovery computer system of FIG. 6, having a computing device configured with site key recovery logic.

FIG. 7 illustrates one embodiment of the computer system 600 of FIG. 6, having a computing device 605 configured with site key recovery logic 610, for recovering a lost site key value associated with an encrypted data item. Encrypted data items may be represented as records or other data structures stored in the computer system 600. In one embodiment, site key recovery logic 610 may be part of a larger computer application (e.g., a computerized encryption/decryption application), configured to recover site key values. Site key recovery logic 610 is configured to computerize the process of recovering site keys from encrypted data items based on information stored in the headers of the encrypted data items.

In one embodiment, the system 600 is a computing/data processing system including an application or collection of distributed applications for enterprise organizations. The applications and computing system 600 may be configured to operate with or be implemented as a cloud-based networking system, a Software as a Service (SaaS) architecture, or other type of computing solution.

With reference to FIG. 7, in one embodiment, site key recovery logic/module 610 is implemented on the computing device 605 and includes logics or modules for implementing and controlling various functional aspects of site key recovery logic/module 610. In one embodiment, site key recovery logic/module 610 includes visual user interface logic/module 620, header analyzing logic/module 630, bin number recovery logic/module 640, filter matching logic/module 650, and index matching logic/module 660.

Other embodiments may provide different logics or combinations of logics that provide the same or similar functionality, and control of that functionality, as site key recovery logic 610 of FIG. 7. In one embodiment, site key recovery logic 610 is an executable application including algorithms and/or program modules configured to perform the functions of the logics. The application is stored in a non-transitory computer storage medium. That is, in one embodiment, the logics of site key recovery logic 610 are implemented as modules of instructions stored on a computer-readable medium.

The computer system 600 also includes a display screen 670 operably connected to the computing device 605. In accordance with one embodiment, the display screen 670 is implemented to display views of and facilitate user interaction with a graphical user interface (GUI) generated by visual user interface logic 620. The graphical user interface may be used, for example, for controlling user selection of an encrypted data item stored in a record of a data cache, as discussed later herein. The graphical user interface may be associated with a site key recovery algorithm and visual user interface logic 620 may be configured to generate the graphical user interface.

In one embodiment, the computer system 600 is a centralized server-side application that provides at least the functions disclosed herein and that is accessed by many users via computing devices/terminals communicating with the computer system 600 (functioning as the server) over a computer network. Thus the display screen 670 may represent multiple computing devices/terminals that allow users (e.g., system administrators) to access and receive services from site key recovery logic 610 via networked computer communications.

In one embodiment, the computer system 600 further includes data cache 680 operably connected to the computing device 605 and/or a network interface to access the data cache 680 via a network connection. In accordance with one embodiment, the data cache 680 is configured to store encrypted data items in records. Each encrypted data item includes a header containing information that can be used by site key recovery logic 610 to recover the site key value that was used to encrypt the data item. The data cache 680 may also store, for example, resultant recovered site key values.

Referring back to the logics of site key recovery logic 610 of FIG. 7, in one embodiment, visual user interface logic 620 is configured to generate a graphical user interface (GUI) to facilitate user interaction with site key recovery logic 610. For example, visual user interface logic 620 includes program code that generates and causes the graphical user interface to be displayed based on an implemented graphical design of the interface. In response to user actions and selections via the GUI, associated aspects of site key recovery logic 610 may be manipulated.

In one embodiment, header analyzing logic 630 is configured to analyze an encrypted data item to identify a header of the encrypted data item (e.g., stored in a record of the data cache 680) and to identify a bin number and a hash table index from within the header of the encrypted data item. As discussed previously herein with respect to at least FIG. 3, the bin number is derived from a first portion (e.g., the first 4-bytes) of an entire site key value (e.g., 8-bytes) using at least a hashing function. The hash table index is derived from the entire site key value (e.g., 8-bytes) using at least a hashing function. The entire site key value (8-bytes) is derived from a password using at least a hashing function. The entire site key value was previously used to encrypt an unencrypted data item to form the encrypted data item as discussed, for example, with respect to FIG. 2.

The process of recovering an entire site key value recovers a first portion of the entire site key value (e.g., the first 4-bytes of an 8-byte site key value), then a second portion of the entire site key value (e.g., the first 6-bytes of the 8-byte site key value), then finally the entire site key value (e.g., the entire 8-bytes). In one embodiment, bin number recovery logic 640 is configured to perform a bin recovery process (see FIG. 9) on the bin number to recover the first portion (e.g., the first 4-bytes) of the entire site key value (e.g., 8-bytes). The bin recovery process performed by bin number recovery logic 640 is discussed in detail herein with respect to FIG. 8 and FIG. 9.

In one embodiment, filter matching logic 650 is configured to perform an iterative filter matching process using at least the first portion of the entire site key value and a site key filter to recover the second portion (e.g., 6-bytes) of the entire site key value (e.g., 8-bytes). In one embodiment, index matching logic 660 is configured to perform an iterative index matching process using at least the second portion (e.g., 6-bytes) of the entire site key value to recover the entire site key value (e.g., 8-bytes). The filter matching process and the index matching process performed respectively by filter matching logic 650 and index matching logic 660 are discussed in detail herein with respect to FIG. 8.

Figure 8:
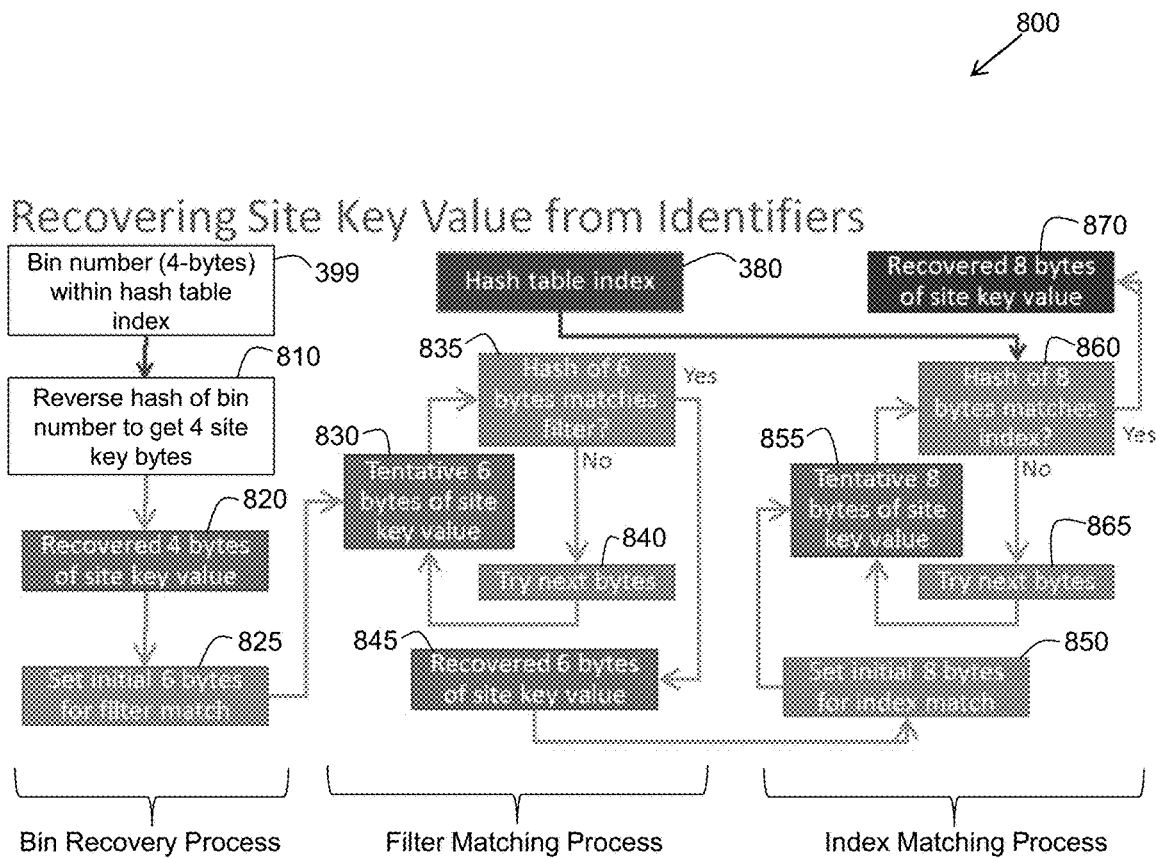
FIG. 8 illustrates one embodiment of a key recovery process, implemented by the site key recovery logic of FIG. 7, for recovering a site key value from identifiers.

FIG. 8 illustrates one embodiment of a key recovery process 800, implemented by site key recovery logic 610 of FIG. 7, for recovering a site key value from identifiers. The key recovery process 800 includes a bin recovery process, a filter matching process, and an index matching process. As seen in FIG. 8, the bin identifier (bin number within the hash table index) 399 and the hash table index 380, which are both stored in the header of an encrypted data item 240, are both used to recover the site key value. A bin recovery process (see FIG. 9) is employed to reverse the bin number to recover a first portion (e.g., 4-bytes) of the site key value. Then an iterative filter matching process is performed, based on the site key filter, to recover a second portion (e.g., 6-bytes) of the site key value. Finally, an iterative index matching process is performed, based on the hash table index, to recover the entire site key value (e.g., the full 8-bytes).

Referring to the bin recovery process in FIG. 8, the bin number 399 from the header of the encrypted data item 240 is input to a reverse hashing of bin number process 810 (bin recovery process) to recover the first portion (e.g., the first 4-bytes) 820 of the site key value that was used to encrypt a data item to form the encrypted data item 240. An embodiment of the reverse hashing of bin number process 810 is shown in detail herein in FIG. 9. In accordance with one embodiment, the bin recovery process is performed by bin number recovery logic 640 of FIG. 7.

Referring to the filter matching process in FIG. 8, at 825, an initial second portion (e.g., 6-bytes) 830 are set for filter matching based on the recovered first portion (e.g., 4-bytes). At 835, the second portion (e.g., 6-bytes) is hashed via a hashing function, and the resultant hash value is compared to the site key filter to determine if the hash value matches the site key filter. When a match does not occur then, at 840 the second portion (e.g., 6-bytes) are updated to form a tentative second portion (e.g., 6-bytes) at 830 and, at 835, the tentative second portion (e.g., 6-bytes) is hashed and the hash value is compared to the site key filter to determine if the hash value matches the site key filter. Again, when a match does not occur then, at 840 the tentative second portion (e.g., 6-bytes) is updated to form another tentative second portion (e.g., 6-bytes) at 830. The iterative process (830 to 835 to 840) continues until a match occurs. When a match occurs at 835, then the latest second portion (e.g., 6-bytes) is considered to be the recovered second portion (e.g., 6-bytes) 845 of the site key value. In accordance with one embodiment, the filter matching process is performed by filter matching logic 650 of FIG. 7.

Referring to the index matching process in FIG. 8, at 850, an initial site key value (e.g., 8-bytes) 855 is set for index matching based on the recovered second portion 845 (e.g., 6-bytes). At 860, the initial site key value (e.g., 8-bytes) is hashed via a hashing function, and the resultant hash value is compared to the hash table index 380 to determine if the hash value matches the hash table index. When a match does not occur then, at 865 the site key value (e.g., 8-bytes) is updated to form a tentative site key value (e.g., 8-bytes) at 855 and, at 860, the tentative site key value (e.g., 8-bytes) is hashed and the hash value is compared to the hash table index 380 to determine if the hash value matches the hash table index. Again, when a match does not occur then, at 865 the tentative site key value (e.g., 8-bytes) is updated to form another tentative site key value (e.g., 8-bytes) at 855. The iterative process (855 to 860 to 865) continues until a match occurs. When a match occurs at 860, then the latest site key value (e.g., 8-bytes) is considered to be the entire and final recovered site key value (e.g., 8-bytes) 870. In accordance with one embodiment, the index matching process is performed by index matching logic 660 of FIG. 7. In one embodiment, the final site key value, as recovered, is stored in the data cache 680 via index matching logic 660.

Figure 9:
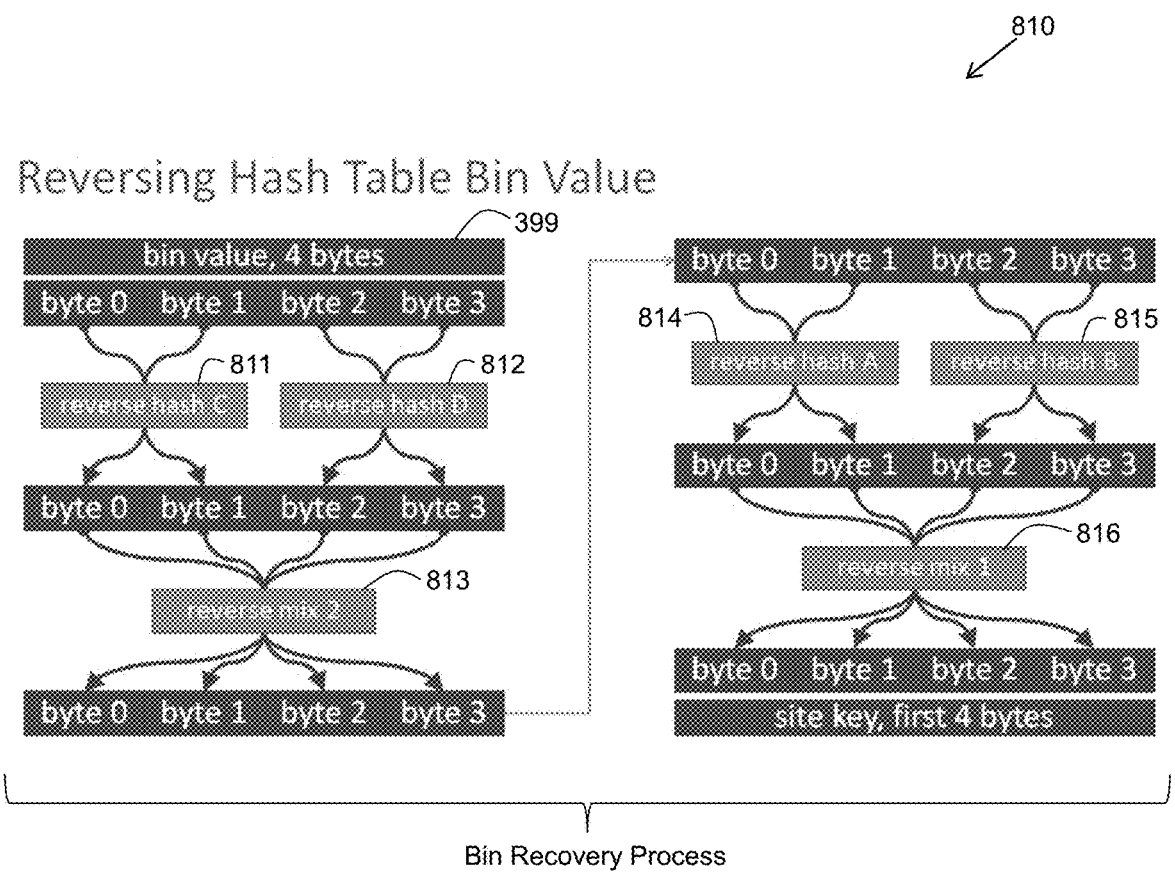
FIG. 9 illustrates one embodiment of a process to reverse the hash table bin value of FIG. 4 to recover the first four (4) bytes of a site key value.

FIG. 9 illustrates one embodiment of the bin recovery process 810 of FIG. 8 to reverse the hash table bin value 399 of FIG. 4 to recover the first four (4) bytes of a site key value. Two corresponding un-mixing functions are used at 813 and 816 in the process to recover the first four (4) bytes of the site key value in FIG. 9. Also, four (4) look-up tables are used at 811, 812, 814, and 815 to reverse the hash functions in the process to recover the first four (4) bytes of the site key value in FIG. 9, when the two (2) byte hash is unique. Reversal uniqueness is confirmed during initial selection of the site key values.

In this manner, a site key value can be recovered for a client by a service provider when the client loses a site key value or a corresponding password. Reliance on specific hardware that is related to the encrypted data is not necessary.

Details of Double AEAD Key Wrapping

Also described herein are systems and methods to wrap key material within the data that is being encrypted. Key material is wrapped (hidden) without using an outside master key. A random value is used to wrap the key material, while the key material is used to wrap the random value. The key material may be a site key, for example. However, the processes described herein may be used to wrap (and unwrap) other types of key material as well.

Encryption uses AES (e.g., AES-128) and authentication uses HMAC with SHA (e.g., SHA-256 and SHA-512), where HMAC is a hashed message authentication code which uses a key. In one embodiment, a deterministic algorithm is used which does not require a master key to be stored elsewhere. Unwrapping parameters are hidden in the wrapped key. External parameters are selected for key generation. A hash value of the external parameters is hidden in a wrapped buffer. Key generation functions hide intermediate key values.

In one embodiment, eight types of hash functions and eight possible padding lengths are used for key generation. The hash values determine the salt values and the number of iterations. Key generation functions generate two AES keys and two HMAC keys. Two passes of AEAD are performed where the first AEAD pass hides the secret key using keys generated from a random seed, and the second AEAD pass hides the random seed using keys generated from the first encrypted data.

With respect to the key generation functions, the hash input is a byte array. The first pass uses a random seed and the second pass uses the first-pass encryption buffer. The hash type specifies the hash function (e.g., SHA-256 or SHA-512) and also specifies a truncation length of the output hash values. The padding length specifies a skipped length for beginning of the hash value. The initial salt value is based on the hash of lengths involved. The number of iterations is based on the hash type and the padding length. The AES key and the HMAC key are extracted from the output hash buffer.

With respect to the parameters for wrapping the secret key, in one embodiment, there are 128 possible combinations of external parameters for two AEAD passes. Eight (8) hash functions and eight (8) padding lengths are available for key generation. With respect to internal parameters for wrapping the secret key, a random seed value is provided. The key can be unwrapped without knowing the random seed value, however. A hash value of the external parameters is encrypted along with the secret key and is used to confirm correct un-wrapping parameters.

With respect to the selection of the key generation parameters, the type of hash functions, the length of padding, and the random seed value are randomly selected. With respect to confirming uniqueness during key wrapping, a wrapped key is generated using the selected parameters. The key may be unwrapped using all possible combinations of the selected parameters. For example, a hash value is calculated for each set of selected parameters and is compared to the hash value in the wrapped key. If more than one hash value matches, the process starts over with new random selections.

Figure 10:
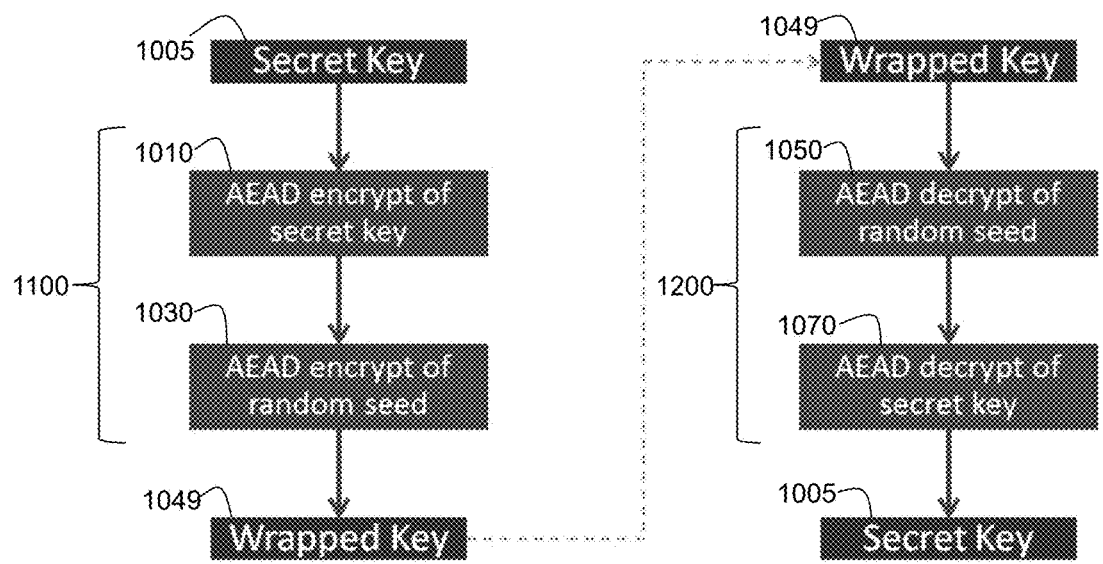
FIG. 10 illustrates one embodiment of a process for wrapping and unwrapping keys.

FIG. 10 illustrates one embodiment of a process 1000 for wrapping and unwrapping keys. A key 1005 can be wrapped using double AEAD (an AEAD encrypt of secret key process 1010 and an AEAD encrypt of random seed process 1030) as shown in FIG. 10. Subsequently, the wrapped key 1049 can be unwrapped using double AEAD (an AEAD decrypt of random seed process 1050 and an AEAD decrypt of secret key process 1070) as shown in FIG. 10. The processes 1050 and 1070 are iterative processes which iterate through the sets of possible parameters (e.g., 128 sets of possible key generation parameters) until the correct set of parameters is found using HMAC authentication.

Wrapping Process

Figure 11:
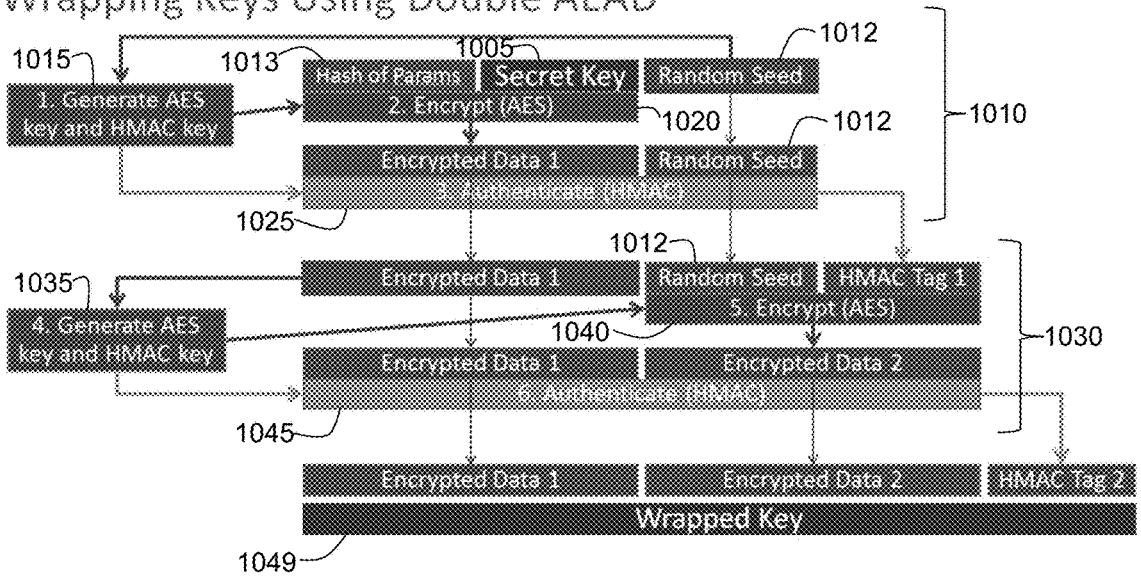
FIG. 11 illustrates the details of one embodiment of wrapping keys using double AEAD.

FIG. 11 illustrates the details of one embodiment of a key wrapping process 1100, implemented by a key wrapping/unwrapping logic/module, using double AEAD. The key wrapping process 1100 includes the AEAD encrypt of secret key process 1010 and the AEAD encrypt of random seed process 1030. The process 1100 starts out with a secret key 1005 that is to be wrapped, generating a random seed 1012, and randomly selecting a set of key generation parameters from sets of possible key generation parameters. A hash 1013 of the selected key generation parameters is formed by running a hash function on the parameters. In one embodiment, the selected key generation parameters indicate which salts and hash functions are to be employed to generate AES keys and HMAC keys during the process 1100. In one embodiment, the secret key 1005, the random seed 1012, and the hash of parameters 1013 are each 8-bytes.

At block 1015, the secret key 1005, the random seed 1012, and the hash of parameters 1013 are used to generate an AES key and a HMAC key. At block 1020, the AES key is used to encrypt the secret key 1005 and the hash of parameters 1013 to form Encrypted Data 1 (e.g., 16-bytes). At block 1025, an HMAC process is performed on the Encrypted Data 1 and the random seed 1012 using the HMAC key to generate HMAC Tag 1 (e.g., 8-bytes) which serves as a digital signature that can be used for authentication as described later herein (e.g., for tamper protection).

At block 1035, the Encrypted Data 1 is used to generate an AES key and an HMAC key. At block 1040, the AES key is used to encrypt the random seed 1012 and HMAC Tag 1 to form Encrypted Data 2 (e.g., 16-bytes). At block 1045, an HMAC process is performed on the Encrypted Data 1 and the Encrypted Data 2 using the HMAC key to generate HMAC Tag 2 (e.g., 8-bytes) which serves as a digital signature that can be used for authentication as described later herein (e.g., for tamper protection). Encrypted Data 1, Encrypted Data 2, and HMAC Tag 2 together generate and form the wrapped key 1049. In one embodiment, Encrypted Data 1 is 16-bytes, Encrypted Data 2 is 16-bytes, and HMAC Tag 2 is 8-bytes. Therefore, the wrapped key 1049 is 40-bytes. In accordance with one embodiment, the wrapped key 1049 is stored in a configuration file in a memory (e.g., a memory device or a storage device).

Unwrapping Process

Figure 12:
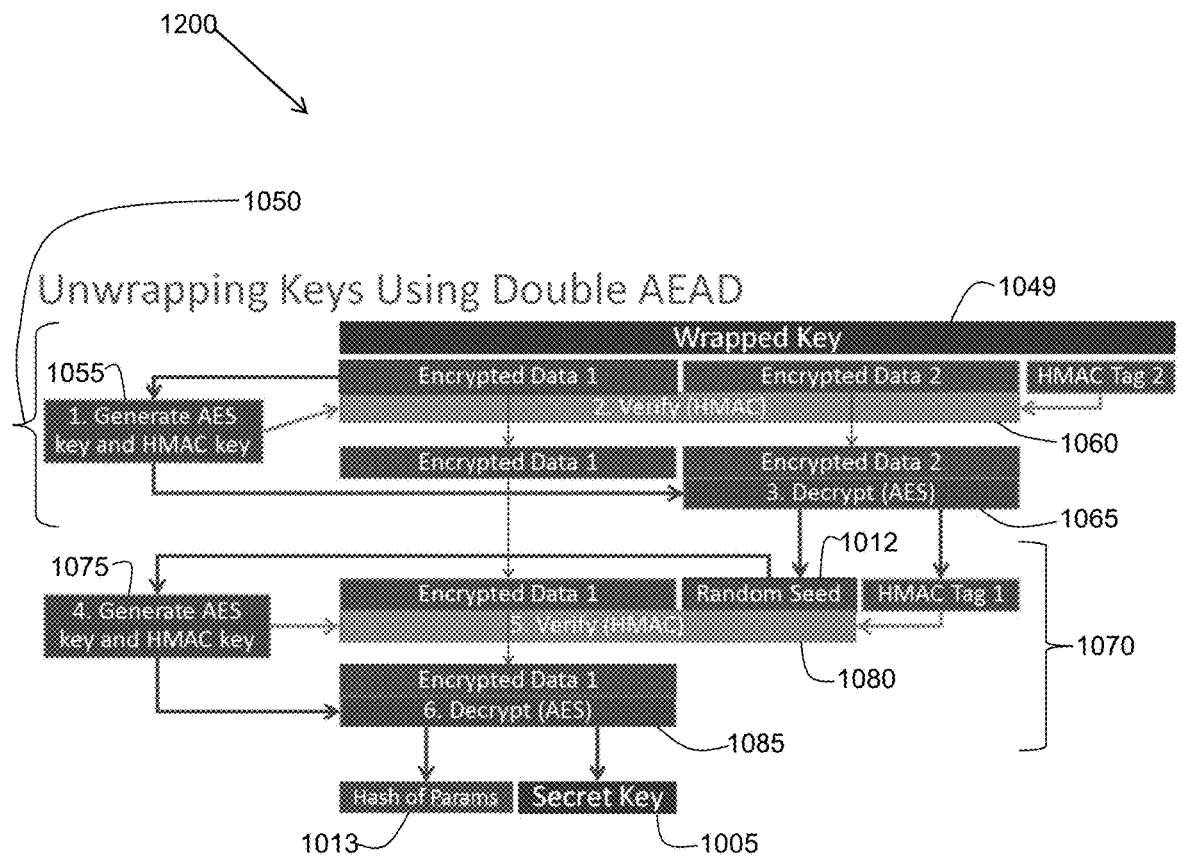
FIG. 12 illustrates the details of one embodiment of unwrapping keys using double AEAD.

When the secret key 1005 (e.g., a site key) is to be used to generate an AES key for encrypting data items, the wrapped key 1049 has to first be read from the configuration file and then unwrapped to recover the secret key 1005. FIG. 12 illustrates the details of one embodiment of a key unwrapping process 1200, implemented by a key wrapping/unwrapping logic/module, using double AEAD. An encryption process can then be controlled to apply the unwrapped secret key to encrypt a selected data item.

At block 1055, the Encrypted Data 1 is used to generate an AES key and a HMAC key using a first set of the sets (e.g., 256 sets) of possible key generation parameters. At block 1060, an HMAC process is performed on the Encrypted Data 1 and the Encrypted Data 2 using the HMAC key to generate a candidate HMAC Tag which is compared to HMAC Tag 2. Blocks 1055 and 1060 iterate through the sets of possible key generation parameters, generating a new AES key and a new HMAC key each time, until the candidate HMAC Tag matches HMAC Tag 2 (e.g., 8-bytes). Once a match is found then, at block 1065, the corresponding AES key is used to decrypt the Encrypted Data 2 to form the random seed 1012 and HMAC Tag 1.

At block 1075, the random seed 1012 is used to generate an AES key and a HMAC key using a first set of the sets of possible key generation parameters. At block 1080, an HMAC process is performed on the Encrypted Data 1 and the random seed 1012 using the HMAC key to generate a candidate HMAC Tag which is compared to HMAC Tag 1. Blocks 1075 and 1080 iterate through the sets of possible key generation parameters, generating a new AES key and a new HMAC key each time, until the candidate HMAC Tag matches HMAC Tag 1. Once a match is found then, at block 1085, the corresponding AES key is used to decrypt the Encrypted Data 1 to form the hash of parameters 1013 and the secret key 1005. The hash of parameters 1013 may be validated to make sure the hash of parameters correspond to a valid set of key generation parameters. In this way, the secret key can be unwrapped.

Figure 13:
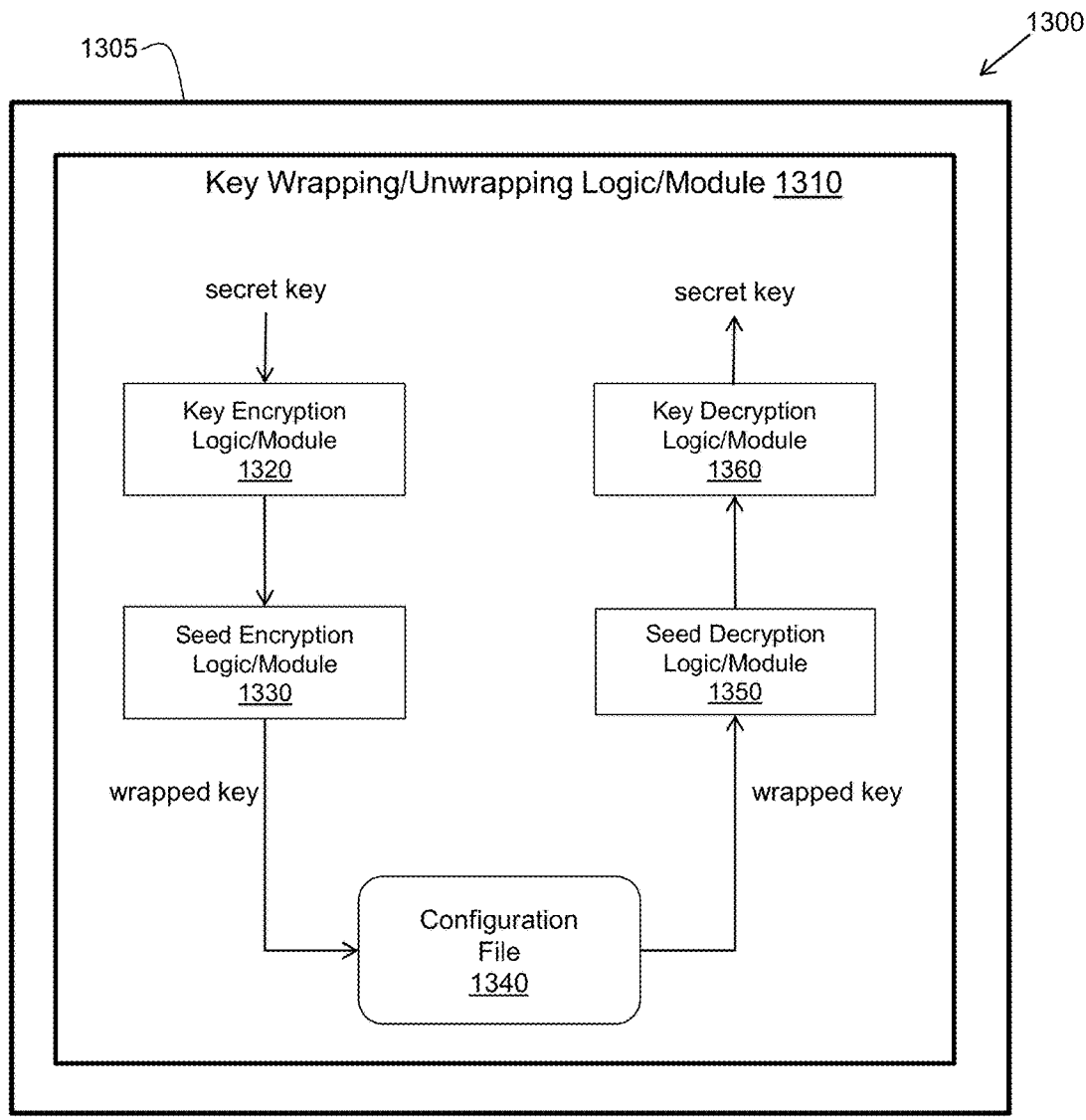
FIG. 13 illustrates one embodiment of a computer system, having a computing device configured with key wrapping/unwrapping logic, for wrapping and unwrapping site key values.

FIG. 13 illustrates one embodiment of a specialized computer system 1300, having a computing device 1305 configured with key wrapping/unwrapping logic 1310, for wrapping and unwrapping site key values (or other types of secret key values). In one embodiment, key wrapping/unwrapping logic 1310 may be part of a larger computer application (e.g., a computerized encryption/decryption application), configured to wrap and unwrap key material. Key wrapping/unwrapping logic 1310 is configured to computerize the process of wrapping and unwrapping, for example, site keys without using an outside master key.

In one embodiment, the system 1300 is a computing/data processing system including an application or collection of distributed applications for enterprise organizations. The applications and computing system 1300 may be configured to operate with or be implemented as a cloud-based networking system, a Software as a Service (SaaS) architecture, or other type of computing solution.

With reference to FIG. 13, in one embodiment, key wrapping/unwrapping logic/module 1310 is implemented on the computing device 1305 and includes logics or modules for implementing and controlling various functional aspects of key wrapping/unwrapping logic/module 1310. In one embodiment, key wrapping/unwrapping logic/module 1310 includes key encryption logic/module 1320, seed encryption logic/module 1330, configuration file 1340, seed decryption logic/module 1350, and key decryption logic/module 1360.

Other embodiments may provide different logics or combinations of logics that provide the same or similar functionality, and control of that functionality, as key wrapping/unwrapping logic/module 1310 of FIG. 13. In one embodiment, key wrapping/unwrapping logic/module 1310 is an executable application including algorithms and/or program modules configured to perform the functions of the logics. The application is stored in a non-transitory computer storage medium. That is, in one embodiment, the logics of key wrapping/unwrapping logic/module 1310 are implemented as modules of instructions stored on a computer-readable medium. In one embodiment, the computer system 1300 is a centralized server-side application that provides at least the functions disclosed herein and that is accessed by many users via computing devices/terminals communicating with the computer system 1300 (functioning as the server) over a computer network.

Wrapping Logic

In one embodiment, as part of wrapping key material (e.g., a site key), key encryption logic 1320 is configured to use the AEAD encryption of secret key process 1010 of FIG. 10 and FIG. 11. Key encryption logic 1320 generates a random seed value and also randomly selects a set of key generation parameters from sets of possible key generation parameters. Key encryption logic 1320 forms a hash of the selected key generation parameters by running a hash function on the parameters. In accordance with one embodiment, the selected key generation parameters indicate which salts and hash functions are to be employed to generate AES keys and HMAC keys during the process 1010.

Key encryption logic 1320 is also configured to generate an AES key and an HMAC key from the key material, the random seed value, and the hash parameters. Key encryption logic 1320 is configured to use the AES key to encrypt the key material and the hash of parameters to form first encrypted data. Key encryption logic 1320 is also configured to perform an HMAC process on the first encrypted data and the random seed value using the HMAC key to generate a first HMAC tag which serves as a digital signature that can be used for authentication.

In one embodiment, as part of wrapping key material, seed encryption logic 1330 is configured to use the AEAD encrypt of random seed process 1030 of FIG. 10 and FIG. 11. Seed encryption logic 1330 generates an AES key and an HMAC key using the first encrypted data out of key encryption logic 1320. Seed encryption logic 1330 is configured to use the AES key to encrypt the random seed value and the first HMAC tag from key encryption logic 1320 to generate a second HMAC tag. Similar to the first HMAC tag, the second HMAC tag serves as a digital signature that can also be used for authentication.

The first encrypted data, the second encrypted data and the second HMAC tag together form a wrapped key (e.g., a wrapped site key). In accordance with one embodiment, the wrapped key is stored in the configuration file 1340. In this manner, a random seed value is used to wrap the key material with encryption, instead of using a separate master key. The random seed value is then itself encrypted and wrapped, using the key material. Therefore, there is no outside master key that needs to be stored and obfuscated.

Unwrapping Logic

When key material (e.g., a site key that has been wrapped) is to be used to generate an AES key for encrypting data items, the wrapped key has to first be read from the configuration file 1340 and then unwrapped to recover the key material. In one embodiment, as part of unwrapping key material (e.g., a site key), seed decryption logic 1350 is configured to read a wrapped key from the configuration file 1340 and use the AEAD decrypt of random seed process 1050 of FIG. 10 and FIG. 12. Seed decryption logic 1350 generates an AES key and an HMAC key using the first encrypted data of the wrapped key and a first set of the sets (e.g., 256 sets) of possible key generation parameters. Seed decryption logic 1350 is configured to use the HMAC key to generate a candidate HMAC tag via an HMAC process performed on the first encrypted data and the second encrypted data of the wrapped key. Seed decryption logic 1350 is configured to compare the candidate HMAC tag to the second HMAC tag of the wrapped key.

Seed decryption logic 1350 is configured to iterate through the sets of possible key generation parameters in a similar manner, generating a new AES key and a new HMAC key each time, until a match is found (i.e., until the candidate HMAC tag matches the second HMAC tag of the wrapped key). Once a match is found, seed decryption logic 1350 is configured to decrypt the second encrypted data of the wrapped key, using the corresponding AES key, to form the random seed value and the first HMAC tag.

In one embodiment, as part of unwrapping key material, key decryption logic 1360 is configured to use the AEAD decrypt of secret key process 1070 of FIG. 10 and FIG. 12. Key decryption logic 1360 is configured to generate an AES key and an HMAC key using the random seed value out of seed decryption logic 1350 and a first set of the sets of possible key generation parameters. Key decryption logic 1360 is also configured to generate a candidate HMAC tag by performing an HMAC process on the first encrypted data of the wrapped key and the random seed value using the HMAC key. Key decryption logic 1360 is configured to compare the candidate HMAC tag to the first HMAC tag.

Key decryption logic 1360 is also configured to iterate through the sets of possible key generation parameters in a similar manner, generating a new AES key and a new HMAC key each time, until the candidate HMAC tag matches the first HMAC tag. Once a match is found, key decryption logic 1360 is configured to decrypt the first encrypted data, using the corresponding AES key, to form the hash of parameters and the key material (e.g., the unwrapped site key). In one embodiment, key decryption logic 1360 is also configured to validate the hash of parameters to make sure the hash of parameters correspond to a valid set of key generation parameters. In this way, seed decryption logic 1350 and key decryption logic 1360 are configured to unwrap a wrapped key.

In this manner, a random value is used to wrap the key material with encryption, instead of using a master key. The random value is then itself encrypted and wrapped, using the key material. Therefore, there is no outside master key that needs to be stored and obfuscated. There is no master key stored in a file or in program code. To un-wrap the wrapped key, the secret keys are derived from key generation functions that use the wrapped key value as input. The key wrapping includes two passes of Authenticated Encryption with Additional Data (AEAD). AEAD is a very secure way to encrypt data items. One pass of AEAD is used to encrypt the original key material. Another pass of AEAD is used to encrypt a random seed value. The wrapped key is the result of the two passes of AEAD. The value of a wrapped key material is securely hidden. The key material can be used to generate Advanced Encryption Standard (AES) keys that can be used to securely encrypt other data items.

Cloud or Enterprise Embodiments

In one embodiment, the present system is computing/data processing system including an executable application or a collection of distributed applications in an enterprise. The key recovery logic is an implemented component/program module of the application. The application and computing system may be configured to operate with or be implemented as a cloud-based networking system, a software as a service (SaaS) architecture, or other type of networked computing solution. In one embodiment the present system is a centralized server-side application that provides at least the functions disclosed herein and that is accessed by many users via computing devices/terminals communicating with the computing system (functioning as the server) over a computer network.

In one embodiment, one or more of the components described herein (including the key recovery logic) are configured as program modules stored in a non-transitory computer readable medium. The program modules are configured with stored instructions that when executed by at least a processor cause the computing device to perform the corresponding function(s) as described herein.

In one embodiment, the present system is a computing/data processing system including an executable application or collection of distributed applications in an enterprise. The wrapping/unwrapping logic is an implemented component/program module of the application. The application and computing system may be configured to operate with or be implemented as a cloud-based networking system, a software as a service (SaaS) architecture, or other type of networked computing solution. In one embodiment the present system is a centralized server-side application that provides at least the functions disclosed herein and that is accessed by many users via computing devices/terminals communicating with the computing system (functioning as the server) over a computer network.

In one embodiment, one or more of the components described herein (including the wrapping/unwrapping logic) are configured as program modules stored in a non-transitory computer readable medium. The program modules are configured with stored instructions that when executed by at least a processor cause the computing device to perform the corresponding function(s) as described herein.

Computing Device Embodiment

Figure 14:
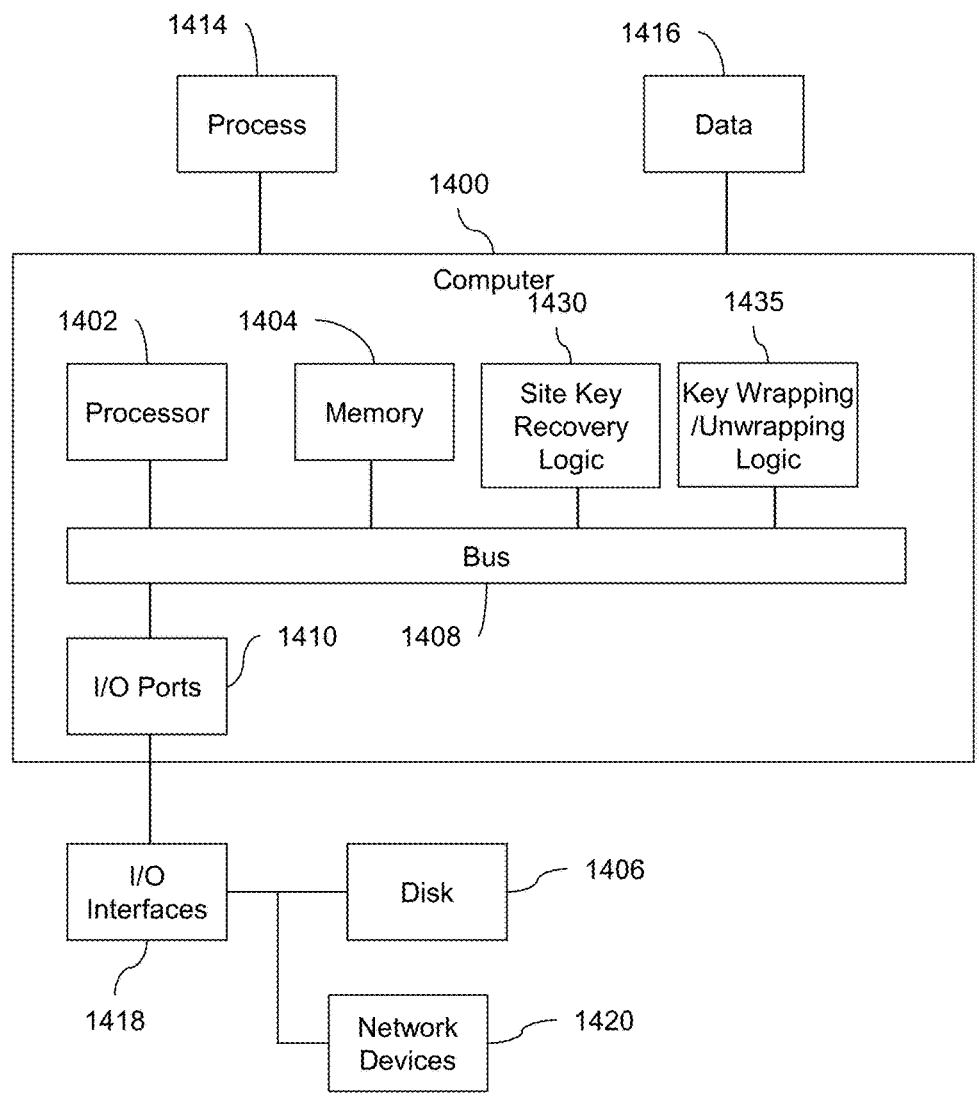
FIG. 14 illustrates an example computing device that is configured and/or programmed with one or more of the example systems and methods described herein, and/or equivalents.

FIG. 14 illustrates an example computing device that is configured and/or programmed with one or more of the example systems and methods described herein, and/or equivalents. The example computing device may be a computer 1400 that includes a processor 1402, a memory 1404, and input/output ports 1410 operably connected by a bus 1408. In one example, the computer 1400 includes site key recovery logic 1430 (e.g., similar to site key recovery logic 610 of FIG. 7) configured to facilitate the functions of site key recovery as previously described herein. The computer 1400 also includes key wrapping/unwrapping logic 1435 (e.g., similar to key wrapping/unwrapping logic 1310 of FIG. 13) configured to facilitate the functions of key wrapping and key unwrapping as previously described herein. In different examples, the logics 1430 and 1435 may be implemented in hardware, a non-transitory computer-readable medium with stored instructions, firmware, and/or combinations thereof. While the logics 1430 and 1435 are illustrated as components attached to the bus 1408, it is to be appreciated that in other embodiments, the logics 1430 and 1435 could be implemented in the processor 1402, stored in memory 1404, or stored in disk 1406.

In one embodiment, logics 1430 and 1435 or the computer is a means (e.g., structure: hardware, non-transitory computer-readable medium, firmware) for performing the actions described. In some embodiments, the computing device may be a server operating in a cloud computing system, a server configured in a Software as a Service (SaaS) architecture, a smart phone, laptop, tablet computing device, and so on.

The means may also be implemented as stored computer executable instructions that are presented to computer 1400 as data 1416 that are temporarily stored in memory 1404 and then executed by processor 1402.

Logic 1430 may also provide means (e.g., hardware, non-transitory computer-readable medium that stores executable instructions, firmware) for performing key recovery. Logic 1435 may also provide means (e.g., hardware, non-transitory computer-readable medium that stores executable instructions, firmware) for performing the key wrapping and unwrapping.

Generally describing an example configuration of the computer 1400, the processor 1402 may be a variety of various processors including dual microprocessor and other multi-processor architectures. A memory 1404 may include volatile memory and/or non-volatile memory. Non-volatile memory may include, for example, ROM, PROM, and so on. Volatile memory may include, for example, RAM, SRAM, DRAM, and so on.

A storage disk 1406 may be operably connected to the computer 1400 via, for example, an input/output (I/O) interface (e.g., card, device) 1418 and an input/output port 1410. The disk 1406 may be, for example, a magnetic disk drive, a solid state disk drive, a floppy disk drive, a Zip drive, a flash memory card, a memory stick, and so on. Furthermore, the disk 1406 may be a CD-ROM drive, a CD-R drive, a CD-RW drive, a DVD ROM, and so on. The memory 1404 can store a process 1414 and/or a data 1416, for example. The disk 1406 and/or the memory 1404 can store an operating system that controls and allocates resources of the computer 1400.

The computer 1400 may interact with input/output (I/O) devices via the I/O interfaces 1418 and the input/output ports 1410. Input/output devices may be, for example, a keyboard, a microphone, a pointing and selection device, cameras, video cards, displays, the disk 1406, the network devices 1420, and so on. The input/output ports 1410 may include, for example, serial ports, parallel ports, and USB ports.

The computer 1400 can operate in a network environment and thus may be connected to the network devices 1420 via the I/O interfaces 1418, and/or the I/O ports 1410. Through the network devices 1420, the computer 1400 may interact with a network. Through the network, the computer 1400 may be logically connected to remote computers. Networks with which the computer 1400 may interact include, but are not limited to, a LAN, a WAN, and other networks.

Definitions and Other Embodiments

In another embodiment, the described methods and/or their equivalents may be implemented with computer executable instructions. Thus, in one embodiment, a non-transitory computer readable/storage medium is configured with stored computer executable instructions of an algorithm/executable application that when executed by a machine(s) cause the machine(s) (and/or associated components) to perform the method. Example machines include but are not limited to a processor, a computer, a server operating in a cloud computing system, a server configured in a Software as a Service (SaaS) architecture, a smart phone, and so on). In one embodiment, a computing device is implemented with one or more executable algorithms that are configured to perform any of the disclosed methods.

In one or more embodiments, the disclosed methods or their equivalents are performed by either: computer hardware configured to perform the method; or computer software embodied in a non-transitory computer-readable medium including an executable algorithm configured to perform the method.

While for purposes of simplicity of explanation, the illustrated methodologies in the figures are shown and described as a series of blocks of an algorithm, it is to be appreciated that the methodologies are not limited by the order of the blocks. Some blocks can occur in different orders and/or concurrently with other blocks from that shown and described. Moreover, less than all the illustrated blocks may be used to implement an example methodology. Blocks may be combined or separated into multiple actions/components. Furthermore, additional and/or alternative methodologies can employ additional actions that are not illustrated in blocks. The methods described herein are limited to statutory subject matter under 35 U.S.C § 101.

The following includes definitions of selected terms employed herein. The definitions include various examples and/or forms of components that fall within the scope of a term and that may be used for implementation. The examples are not intended to be limiting. Both singular and plural forms of terms may be within the definitions.

References to "one embodiment", "an embodiment", "one example", "an example", and so on, indicate that the embodiment(s) or example(s) so described may include a particular feature, structure, characteristic, property, element, or limitation, but that not every embodiment or example necessarily includes that particular feature, structure, characteristic, property, element or limitation. Furthermore, repeated use of the phrase "in one embodiment" does not necessarily refer to the same embodiment, though it may.

ASIC: application specific integrated circuit.
CD: compact disk.
CD-R: CD recordable.
CD-RW: CD rewriteable.
DVD: digital versatile disk and/or digital video disk.
LAN: local area network.
RAM: random access memory.
DRAM: dynamic RAM.
SRAM: synchronous RAM.
ROM: read only memory.
PROM: programmable ROM.
USB: universal serial bus.
WAN: wide area network.

An "operable connection", or a connection by which entities are "operably connected", is one in which signals, physical communications, and/or logical communications may be sent and/or received. An operable connection may include a physical interface, an electrical interface, and/or a data interface. An operable connection may include differing combinations of interfaces and/or connections sufficient to allow operable control. For example, two entities can be operably connected to communicate signals to each other directly or through one or more intermediate entities (e.g., processor, operating system, logic, non-transitory computer-readable medium). An operable connection may include one entity generating data and storing the data in a memory, and another entity retrieving that data from the memory via, for example, instruction control. Logical and/or physical communication channels can be used to create an operable connection.

"Computer-readable medium" or "computer storage medium", as used herein, refers to a non-transitory medium that stores instructions and/or data configured to perform one or more of the disclosed functions when executed. A computer-readable medium may take forms, including, but not limited to, non-volatile media, and volatile media. Non-volatile media may include, for example, optical disks, magnetic disks, and so on. Volatile media may include, for example, semiconductor memories, dynamic memory, and so on. Common forms of a computer-readable medium may include, but are not limited to, a floppy disk, a flexible disk, a hard disk, a magnetic tape, other magnetic medium, an application specific integrated circuit (ASIC), a programmable logic device, a compact disk (CD), other optical medium, a random access memory (RAM), a read only memory (ROM), a memory chip or card, a memory stick, solid state storage device (SSD), flash drive, and other media from which a computer, a processor or other electronic device can function with. Each type of media, if selected for implementation in one embodiment, may include stored instructions of an algorithm configured to perform one or more of the disclosed and/or claimed functions. Computer-readable media described herein are limited to statutory subject matter under 35 U.S.C § 101.

"Logic", as used herein, represents a component that is implemented with computer or electrical hardware, a non-transitory medium with stored instructions of an executable application or program module, and/or combinations of these to perform any of the functions or actions as disclosed herein, and/or to cause a function or action from another logic, method, and/or system to be performed as disclosed herein. Equivalent logic may include firmware, a microprocessor programmed with an algorithm, a discrete logic (e.g., ASIC), at least one circuit, an analog circuit, a digital circuit, a programmed logic device, a memory device containing instructions of an algorithm, and so on, any of which may be configured to perform one or more of the disclosed functions. In one embodiment, logic may include one or more gates, combinations of gates, or other circuit components configured to perform one or more of the disclosed functions. Where multiple logics are described, it may be possible to incorporate the multiple logics into one logic. Similarly, where a single logic is described, it may be possible to distribute that single logic between multiple logics. In one embodiment, one or more of these logics are corresponding structure associated with performing the disclosed and/or claimed functions. Choice of which type of logic to implement may be based on desired system conditions or specifications. For example, if greater speed is a consideration, then hardware would be selected to implement functions. If a lower cost is a consideration, then stored instructions/executable application would be selected to implement the functions. Logic is limited to statutory subject matter under 35 U.S.C. § 101.

"User", as used herein, includes but is not limited to one or more persons, computers or other devices, or combinations of these.

While the disclosed embodiments have been illustrated and described in considerable detail, it is not the intention to restrict or in any way limit the scope of the appended claims to such detail. It is, of course, not possible to describe every conceivable combination of components or methodologies for purposes of describing the various aspects of the subject matter. Therefore, the disclosure is not limited to the specific details or the illustrative examples shown and described. Thus, this disclosure is intended to embrace alterations, modifications, and variations that fall within the scope of the appended claims, which satisfy the statutory subject matter requirements of 35 U.S.C. § 101.

To the extent that the term "includes" or "including" is employed in the detailed description or the claims, it is intended to be inclusive in a manner similar to the term "comprising" as that term is interpreted when employed as a transitional word in a claim.

To the extent that the term "or" is used in the detailed description or claims (e.g., A or B) it is intended to mean "A or B or both". When the applicants intend to indicate "only A or B but not both" then the phrase "only A or B but not both" will be used. Thus, use of the term "or" herein is the inclusive, and not the exclusive use.

To the extent that the phrase "one or more of, A, B, and C" is used herein, (e.g., a data store configured to store one or more of, A, B, and C) it is intended to convey the set of possibilities A, B, C, AB, AC, BC, and/or ABC (e.g., the data store may store only A, only B, only C, A&B, A&C, B&C, and/or A&B&C). It is not intended to require one of A, one of B, and one of C. When the applicants intend to indicate "at least one of A, at least one of B, and at least one of C", then the phrasing "at least one of A, at least one of B, and at least one of C" will be used.

What is claimed is:

1. A computer-implemented method performed by a computing device where the computing device includes at least a processor for executing instructions from a memory, the method comprising:
   selecting a secret key for encryption;
   encrypting, by at least the processor, the secret key by applying a first pass of Authenticated Encryption with Additional Data (AEAD) using first keys generated from a random seed value;
   encrypting, by at least the processor, the random seed value by applying a second pass of the Authenticated Encryption with Additional Data (AEAD) using second keys generated from the encrypted secret key; and
   generating, by at least the processor, a wrapped key by combining the encrypted secret key and the encrypted random seed value.

2. The computer-implemented method of claim 1, wherein encrypting the secret key generates a first encrypted data, and wherein encrypting the random seed generates a second encrypted data without using an outside master key.

3. The computer-implemented method of claim 1, wherein the first keys are generated as an Advanced Encryption Standard (AES) key and a hashed message authentication code (HMAC) key;
   wherein the AES key and the HMAC key are generated from the secret key, the random seed value, and a selected set of hash parameters.

4. The computer-implemented method of claim 1, wherein the second keys are generated as an Advanced Encryption Standard (AES) key and a hashed message authentication code (HMAC) key; and wherein the AES key and the HMAC key are generated from the encrypted secret key to encrypt the random seed value.

5. The computer-implemented method of claim 1, further comprising unwrapping the wrapped key by at least:
decrypting the encrypted random seed value from the wrapped key by applying the AEAD using the second keys generated from the encrypted secret key;
decrypting the encrypted secret key by applying the AEAD using the first keys generated from the decrypted random seed value; and
generating the secret key from the decrypting of the encrypted secret key.

6. A computer system, comprising:
one or more processors configured to at least execute instructions;
a memory connected to the one or more processors;
a non-transitory computer-readable medium storing instructions that, when executed by the one or more processors of the computing device, cause the computing device to at least:
select a secret key for encryption;
encrypt the secret key by applying a first pass of Authenticated Encryption with Additional Data (AEAD) using first keys generated from a random seed value;
encrypt the random seed value by applying a second pass of the Authenticated Encryption with Additional Data (AEAD) using second keys generated from the encrypted secret key; and
generate a wrapped key by combining the encrypted secret key and the encrypted random seed value.

7. The computer system of claim 6, wherein the instructions for encrypting the secret key cause the processor to generate a first encrypted data, and
wherein encrypting the random seed generates a second encrypted data without using an outside master key.

8. The computer system of claim 6, wherein the first keys include an Advanced Encryption Standard (AES) key and a hashed message authentication code (HMAC) key;
wherein the processor is configured to generate the AES key and the HMAC key from the secret key, the random seed value, and a selected set of hash parameters.

9. The computer system of claim 6, wherein the second keys include an Advanced Encryption Standard (AES) key and a hashed message authentication code (HMAC) key; and
wherein the processor is configured to generate the AES key and the HMAC key from the encrypted secret key to encrypt the random seed value.

10. The computer system of claim 6, wherein the non-transitory computer-readable medium further includes instructions that when executed cause the processor to unwrap the wrapped key by at least:
decrypt the encrypted random seed value from the wrapped key by applying the AEAD using the second keys generated from the encrypted secret key;
decrypt the encrypted secret key by applying the AEAD using the first keys generated from the decrypted random seed value; and
generate the secret key from the decrypting of the encrypted secret key.

11. A non-transitory computer-readable medium storing instructions that, when executed by one or more processors of a computing device, cause the computing device to at least:
select a secret key for encryption;
encrypt the secret key by applying a first pass of Authenticated Encryption with Additional Data (AEAD) using first keys generated from a random seed value;
encrypt the random seed value by applying a second pass of the Authenticated Encryption with Additional Data (AEAD) using second keys generated from the encrypted secret key; and
generate a wrapped key by combining the encrypted secret key and the encrypted random seed value.

12. The non-transitory computer-readable medium of claim 11, wherein the instructions further comprise instructions that, when executed by the one or more processors, cause the computing device to at least encrypt the secret key causing the processor to generate a first encrypted data, and wherein encrypting the random seed generates a second encrypted data without using an outside master key.

13. The non-transitory computer-readable medium of claim 11, wherein the first keys are generated as an Advanced Encryption Standard (AES) key and a hashed message authentication code (HMAC) key;
wherein the instructions are configured to cause the processor to generate the AES key and the HMAC key from the secret key, the random seed value, and a selected set of hash parameters.

14. The non-transitory computer-readable medium of claim 11, wherein the second keys are generated as an Advanced Encryption Standard (AES) key and a hashed message authentication code (HMAC) key; and
wherein the instructions are configured to cause the processor to generate the AES key and the HMAC key from the encrypted secret key to encrypt the random seed value.

15. The non-transitory computer-readable medium of claim 11, wherein the instructions further include instructions that when executed cause the processor to unwrap the wrapped key by at least:
decrypting the encrypted random seed value from the wrapped key by applying the AEAD using the second keys generated from the encrypted secret key;
decrypting the encrypted secret key by applying the AEAD using the first keys generated from the decrypted random seed value; and
generating the secret key from the decrypting of the encrypted secret key.

* * * * *